No. 615,155. Patented Nov. 29, 1898.
F. L. GEORGE.
FURNITURE CASTER.
(Application filed Feb. 12, 1898.)
(No Model.)
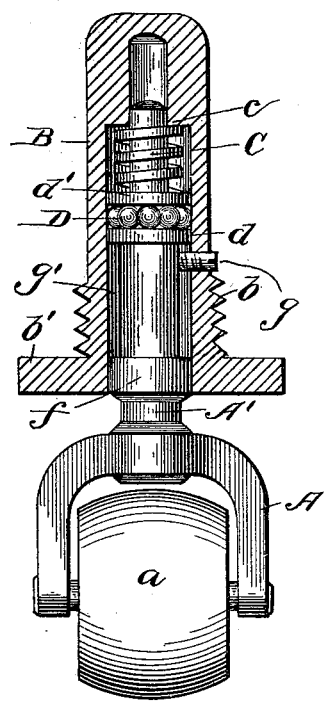
Witnesses
Inventor
Frank L. George
By Edmund Bros,
Attorneys

UNITED STATES PATENT OFFICE.

FRANK L. GEORGE, OF SALT LAKE CITY, UTAH.

FURNITURE-CASTER.

SPECIFICATION forming part of Letters Patent No. 615,155, dated November 29, 1898.

Application filed February 12, 1898. Serial No. 670,107. (No model.)

*To all whom it may concern:*

Be it known that I, FRANK L. GEORGE, a citizen of the United States, residing at Salt Lake City, in the county of Salt Lake and State of Utah, have invented certain new and useful Improvements in Furniture-Casters; and I do hereby declare the following to be a full, clear, and exact description of the invention, such as will enable others skilled in the art to which it appertains to make and use the same.

My invention relates to an improved furniture-caster, more particularly for pianos.

It has for its object to effect the ready and substantial connection or attachment of the caster to the furniture or piano leg, to provide for the automatic movement or adjustment of the roll or caster to any unevenness in the floor, and to reduce friction to the minimum, while convenience and facility are promoted in constructing and arranging or assembling the parts.

The invention therefore consists of the combination and arrangement of parts, including their construction, all substantially as hereinafter more fully disclosed, and specifically pointed out in the claim.

In the accompanying drawing, illustrating the preferred form of carrying out my invention, the figure is a sectional elevation, partly in side view, of the same.

Latitude is allowed herein as to matters of detail, as they may be varied without departing from the spirit or principles of my invention and the same yet remain intact.

A refers to the truck or bracket, forming bearings for the axle or trunnions of the roll or wheel $a$ and having a spindle or stem $A'$, upwardly extending therefrom, as usual in this class of contrivances.

B is a socket or housing to receive the spindle or stem $A'$ and having an external screw $b$, with an angular terminal $b'$ at its lower end to provide for the application thereto of a wrench to enable the ready screwing of said housing or socket into the previously-prepared furniture or piano leg. Thus said housing or socket is adapted to be readily connected or attached as aforesaid without the use of additional fastenings or screws and with facility and ease.

C is a preferably coiled or helical spring arranged upon the stem or spindle $A'$ within the housing or socket B, with its ends bearing upon said socket or housing and said spindle or stem, respectively, its pressure being exerted upward and downward to furnish a spring-bearing for the latter and to force the caster outward or downward in case of any depression or unevenness in the floor, whereby the caster or roll will automatically adjust or accommodate itself thereto, and thus keep the article of furniture or piano level, as greatly desirable.

The interior of the socket or housing may be provided a short distance below its upper end with a shoulder, as at $c$, for that end of the spring C to rest against, and the spindle or stem $A'$ is reduced diametrically a suitable distance from its upper end downward to near its mid-length. Upon this reduction of the stem or spindle $A'$ at its lower end is produced a circular flange $d$, upon which is placed a series of non-frictional balls or bearings D, adapted to bear against the inner sides of the socket or housing, thus combining with a diametric enlargement $f$ of said spindle lower down to center the spindle and reduce friction to the minimum. Upon the series of balls or bearings D is also placed an annulus or ring $d'$, preventing the accidental upward displacement of said balls and furnishing a direct bearing for the lower end of the spring C and separating it from said balls or bearings.

The stem or spindle $A'$ is retained in the housing or socket as against endwise displacement by a pin or stud $g$, projecting from the inside of said socket into an annular recess $g'$ between the flange $d$ and the enlargement $f$, said recess being of sufficient depth to allow of the requisite vertical play or movement of the spindle with the roll.

This invention effects a ready and substantial connection or attachment of the caster to the furniture or piano leg, provides for the automatic movement or adjustment of the caster to any irregularities or unevenness in the floor, centers the spindle or stem of the caster, reduces friction to the minimum, and provides for housing the spring and ball-bearings within the housing or socket.

Having thus fully described my invention, what I claim as new, and desire to secure by Letters Patent, is—

In a device of the character described, the combination, with the socket or housing, of the caster spindle or stem having a diametric reduction and a flange at the bottom of said reduction, the series of ball-bearings, arranged upon said flange, an annulus, or ring arranged upon said spindle and resting upon said ball-bearings, and the spring having its lower end bearing upon said annulus or ring and its upper end bearing upon said socket, substantially as set forth.

In testimony whereof I affix my signature in presence of two witnesses.

FRANK L. GEORGE.

Witnesses:
G. W. THOMPSON,
L. ZUTZMAN, Jr.